US011977265B2

(12) United States Patent
Tanaka et al.

(10) Patent No.: US 11,977,265 B2
(45) Date of Patent: May 7, 2024

(54) OPTICAL DEVICE

(71) Applicant: Nippon Telegraph and Telephone Corporation, Tokyo (JP)

(72) Inventors: Takuya Tanaka, Tokyo (JP); Makoto Abe, Tokyo (JP); Kota Shikama, Tokyo (JP); Takao Fukumitsu, Tokyo (JP); Norio Sato, Tokyo (JP); Atsushi Aratake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 214 days.

(21) Appl. No.: 17/775,004

(22) PCT Filed: Nov. 13, 2019

(86) PCT No.: PCT/JP2019/044528
§ 371 (c)(1),
(2) Date: May 6, 2022

(87) PCT Pub. No.: WO2021/095161
PCT Pub. Date: May 20, 2021

(65) Prior Publication Data
US 2022/0357534 A1      Nov. 10, 2022

(51) Int. Cl.
*G02B 6/42* (2006.01)
(52) U.S. Cl.
CPC ................. *G02B 6/4231* (2013.01)

(58) Field of Classification Search
CPC .... G02B 6/4231; G02B 6/423; G02B 6/4228; G02B 6/4219
See application file for complete search history.

(56) References Cited

U.S. PATENT DOCUMENTS

2016/0306120 A1* 10/2016 Matsumoto ........ G02B 6/12004
2018/0188454 A1* 7/2018 Lipson ................ G02B 6/3652

OTHER PUBLICATIONS

Saeki et al., "100Gbit/s compact transmitter module integrated with optical multiplexer", 2013 IEEE Photonics Conference, Sep. 8, 2013, 2 pages.
Yashiki, et al., "5 mW/Gbps hybrid-integrated Si-photonics-basedoptical I/O cores and their 25-Gbps/ch error-freeoperation with over 300-m MMF", OFC 2015, Optical Society of America, Mar. 22, 2015, 3 pages.

* cited by examiner

*Primary Examiner* — Sung H Pak
(74) *Attorney, Agent, or Firm* — Slater Matsil, LLP

(57) ABSTRACT

An optical element that is optically coupled to light inlet/outlet ends of an optical fiber is disposed on a base placed near the light inlet/outlet ends of the optical fiber. Moreover, a rod-like reinforcing member has an integral structure fixed into a first hole formed in the optical fiber and a second hole formed in the base 102.

13 Claims, 5 Drawing Sheets

OPTICAL DEVICE

CROSS-REFERENCE TO RELATED APPLICATIONS

This application is a national phase entry of PCT Application No. PCT/JP2019/044528, filed on Nov. 13, 2019, which application is hereby incorporated herein by reference.

TECHNICAL FIELD

The present invention relates to an optical device provided with an optical fiber.

BACKGROUND

The recent communication capacity of the Internet has been rapidly increased by posting and viewing of videos from smartphones to and from video distribution services such as "YouTube (registered trademark)" and network services such as a social networking service. Moreover, the communication capacity is expected to further increase in the future as the IoT (Internet of Things) becomes widely available, devices communicate with each other via the Internet, and the Internet prevails in an area that has not been provided with Internet access.

Locations expected to increase in communication capacity include the inside of a data center for storing data and a location between data centers as well as a trunk system having the largest transmission capacity. In such a communication technology, a transceiver for converting electricity and light acts as a key component. Thus, an important challenge is to increase the transmission capacity of a transceiver. After the development of 100 Gb/s transmission capacities, transmission capacities of 400 Gb/s are under development. Another important challenge is to provide space savings for transceivers. In order to increase the number of transceivers to be disposed in a line card mounted in a transmitter, the dimensions of the transceivers are reduced in compliance with CFP4 and QSFP28 standards.

There has been a trend to provide optical interconnection between server boards as well as between the servers of a data center. A conventional transceiver can be disposed only outside and around a line card. For placement in a board, ultrasmall transceivers are necessary. A technique for implementing such an ultrasmall transceiver is, for example, "Optical I/O core" (see NPLs 1 and 2). This technique relates to a 5 mm square transceiver with low power consumption. The transceiver is used to transmit a high-frequency signal between boards without noise or attenuation, rather than between servers.

CITATION LIST

Non Patent Literature

[NPL 1] T. Saeki et al., "100 Gbit/s compact transmitter module integrated with optical multiplexer", IEEE Photonics Conference (Bellevue, WA, USA), paper TuG3.2, 2013.

[NPL 2] K. Yashiki et al., "5 mW/Gbps hybrid-integrated Si-photonics-based optical I/O cores and their 25-Gbps/ch error-free operation with over 300-m MMF", Optical Society America, paper Th1G.1, 2015.

SUMMARY

Technical Problem

As an electric signal speeds up, the signal suffers attenuation even over a short distance in a board. In the transmission of a signal, signal attenuation caused by light is much smaller than that of electricity. Thus, it is necessary to optically connect LSIs in the board. However, "optical I/O core" has a 5 mm square footprint. In actual use for optical interconnection between ICs, "optical I/O core" occupies an area not smaller than the IC. This prevents the circuit layout of a printed circuit board (PCB) from being flexibly designed in optical connection using "optical I/O core". Hence, transceivers quite smaller than the sizes of ICs are required.

Embodiments of the present invention have been devised to solve the problems. An object of embodiments of the present invention is to downsize a transceiver.

Means for Solving the Problem

An optical device according to embodiments of the present invention includes: an optical fiber; a base disposed near the light inlet/outlet ends of the optical fiber; an optical element that is disposed on the base and is optically coupled to the light inlet/outlet ends of the optical fiber; an electric element that is disposed on the base and is electrically connected to the optical element; a first hole formed in a clad of the optical fiber from the vicinity of the inlet/outlet ends of the optical fiber; a second hole formed in the base from the vicinity of the light inlet/outlet ends of the optical fiber; a rod-like reinforcing member having an integral structure fixed into the first hole and the second hole; and an adhesive layer disposed between the reinforcing member and the first hole so as to fix the reinforcing member into the first hole.

Effects of Embodiments of the Invention

As described above, according to embodiments of the present invention, the optical element that is optically coupled to the light inlet/outlet ends of the optical fiber is disposed on the base placed near the light inlet/outlet ends of the optical fiber, and the rod-like reinforcing member is provided with an integral structure fixed into the first hole formed in the optical fiber and the second hole formed in the base, thereby downsizing a transceiver.

DETAILED DESCRIPTION OF ILLUSTRATIVE EMBODIMENTS

Figure 1:
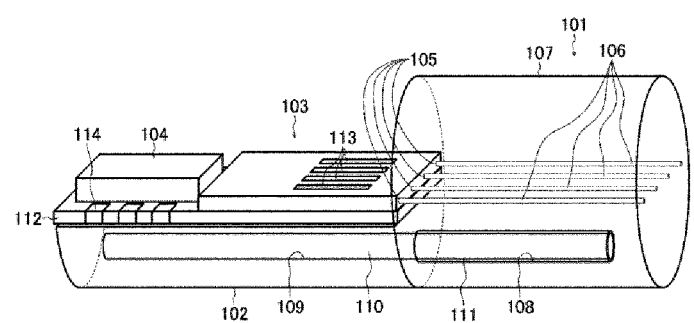
FIG. 1 is a perspective view illustrating the configuration of an optical device according to an embodiment of the present invention.
Figure 2:
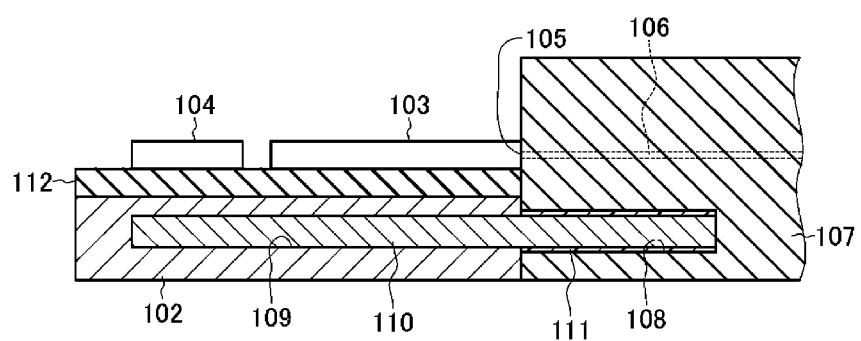
FIG. 2 is a cross-sectional view illustrating the configuration of the optical device according to the embodiment of the present invention.

Referring to FIGS. 1 and 2, an optical device according to an embodiment of the present invention will be described below. The optical device includes an optical fiber 101, a base 102, an optical element 103, and an electric element 104.

The base 102 is disposed near light inlet/outlet ends 105 of the optical fiber 101. The base 102 can be made of a material having a high thermal conductance with excellent heat dissipation, for example, aluminum.

The optical element 103 is disposed on the base 102 and is optically coupled to the light inlet/outlet ends 105 of the optical fiber 101. In this example, the optical element 103 includes a plurality of channels and external terminals 113 for the respective channels. Typically, the optical element 103 has an array architecture including a plurality of output channels (LD) or a plurality of input channels (PD). Moreover, in this example, the optical fiber 101 is, for example, a multicore fiber including a plurality of cores 106 and a clad 107 and has a diameter of, for example, 125 μm to 300 μm. The optical fiber 101 is made of a quartz material. The optical fiber 101 may be made of polymer resin or the like.

For the respective light inlet/outlet ends 105 of the cores 106 of the multicore fiber, the channels are disposed in the optical element 103. FIG. 1 only illustrates some of the cores 106 of the multicore fiber. For example, the optical element 103 is a light emitting element such as a laser diode (Laser Diode: LD). The optical element 103 may be a light receiving element such as a PD (Photo Diode: PD). The optical element 103 may be provided with, for example, a plurality of output channels, each including an LD. Alternatively, the optical element 103 may be provided with a plurality of input channels, each including a PD.

The electric element 104 is disposed on the base 102 and is electrically connected to the optical element 103. In the present embodiment, an insulating member 112 is provided between the optical element 103 and the base 102. The insulating member 112 may be also disposed between the electric element 104 and the base 102. For example, the insulating member 112 may be made of glass or polymer resins such as plastics. On parts of the insulating member 112, external terminals 114 of the electric element 104 are formed. The electric element 104 is, for example, a driver IC for the optical element 103 that is an LD. The optical element 103 may be a trans-impedance amplifier (TIA) or an amplifier for the optical element 103 that is a PD.

The optical device according to the embodiment further includes a first hole 108 that is formed in the clad 107 of the optical fiber 101 from the vicinity of the light inlet/outlet ends 105 of the optical fiber 101 and a second hole 109 that is formed in the base 102 from the vicinity of the light inlet/outlet ends 105 of the optical fiber 101. For example, the first hole 108 is shaped like a cylinder extending in the waveguide direction of the optical fiber 101. The second hole 109 is also shaped like a cylinder extending in the waveguide direction of the optical fiber 101.

Additionally, the optical device includes a rod-like reinforcing member 110 having an integral structure fixed into the first hole 108 and the second hole 109. The provision of the reinforcing member no improves the strength of the optical fiber 101 over an area where the reinforcing member no is inserted, and ensures the strength of a connected portion between the optical fiber 101 and the base 102. For example, the reinforcing member 110 may be cylindrical. The reinforcing member no can be made of a material having a high Young's modulus, for example, tungsten carbide.

In this configuration, the hole diameter of the first hole 108 is larger than the diameter of the reinforcing member 110. In the first hole 108, the reinforcing member no is bonded and fixed into the first hole 108 with an adhesive layer 111 disposed between the reinforcing member no and the first hole 108. The adhesive layer 111 may include an ultraviolet-curing adhesive in a cured state.

The first hole 108 can be formed in the clad 107 by, for example, techniques such as HAF (Hole Assisted Fiber) (Reference 1). The second hole 109 can be formed in the base 102 by a well-known technique of machining.

Figure 3A:
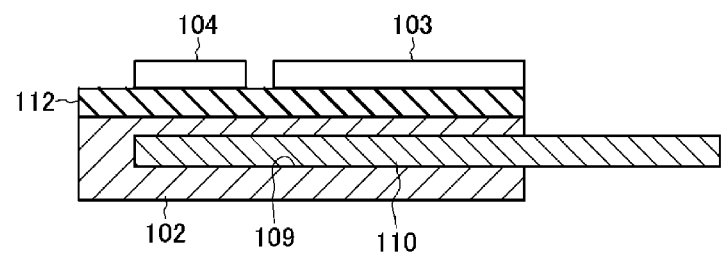
FIG. 3A is a cross-sectional view illustrating the configuration of the optical device being manufactured, for an explanation on a method of manufacturing the optical device according to the embodiment of the present invention.
Figure 3B:
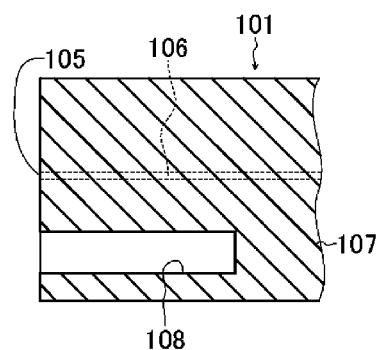
FIG. 3B is a cross-sectional view illustrating the configuration of the optical device being manufactured, for an explanation on the method of manufacturing the optical device according to the embodiment of the present invention.
Figure 3C:
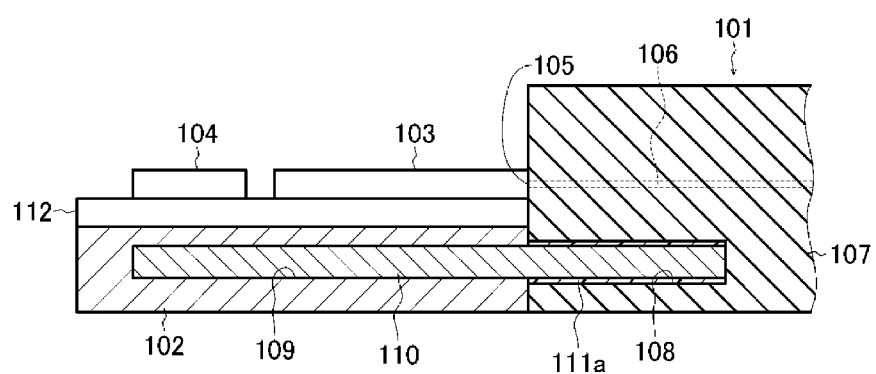
FIG. 3C is a cross-sectional view illustrating the configuration of the optical device being manufactured, for an explanation on the method of manufacturing the optical device according to the embodiment of the present invention.

Referring to FIGS. 3A, 3B, and 3C, a method of manufacturing the optical device according to the embodiment will be simply described below.

First, as illustrated in FIG. 3A, the second hole 109 is formed in the base 102, the insulating member 112 is formed on the base 102 including the formed second hole 109, a predetermined wiring pattern and electrodes or the like are formed on the insulating member 112, and the optical element 103 and the electric element 104 are disposed (mounted). The mounting positions of the optical element 103 and the electric element 104 are determined according to the machine accuracy of an apparatus used for mounting the elements. The elements are disposed at, for example, about ±several μm.

Subsequently, one end of the reinforcing member no is inserted and fixed into the second hole 109. The reinforcing member 110 can be fixed into the second hole 109 by using, for example, an adhesive. For example, well-known adhesives such as a mixture of two adhesives and a thermosetting adhesive can be used to fix the reinforcing member no inserted into the second hole 109. If the reinforcing member 110 is made of an ultraviolet-ray transmitting material such as glass, an ultraviolet-curing adhesive may be used. Moreover, the hole diameter of the second hole 109 is optionally set so as to fit and fix the reinforcing member 110 into the second hole 109 without looseness.

As illustrated in FIG. 3B, the first hole 108 is then formed in the clad 107 of the optical fiber 101. Subsequently, as illustrated in FIG. 3C, the other end of the reinforcing member 110 is inserted into the first hole 108, and then a clearance between the first hole 108 and the reinforcing member no is filled with an ultraviolet-curing adhesive ma. The hole diameter (diameter) of the first hole 108 is set larger than the outside diameter (diameter) of the reinforcing member 110 by about 20 μm, forming a clearance of about 20 μm between the first hole 108 and the reinforcing member no. The clearance is filled with the adhesive 111a by capillarity.

Subsequently, the optical element 103 and the light inlet/outlet ends 105 are aligned before the adhesive 111a is cured. For example, the optical element 103 including an LD is operated to emit a laser beam from the optical element 103. The positional relationship between the optical fiber 101 and the base 102 is adjusted to a position where a laser beam passing through the corresponding core 106 has maximum light intensity (active alignment). In this alignment, a flat-type PD is disposed on the other end of the optical fiber 101 that allows light incident from the light inlet/outlet ends 105 of the optical fiber 101 to be emitted from the other end. The light intensity of a laser beam passing through the core 106 can be measured by the measurement of the intensity of a signal outputted after being photoelectrically converted through the flat-type PD.

For example, the accuracy of intervals between the laser-beam outlet ends (output port) of an LD array including a plurality of output channels is determined on the submicron order according to accuracy in the manufacture of well-known semiconductor devices. The accuracy of intervals between the cores of a multicore fiber can be also determined on the submicron order. Thus, if intervals between the output ports of an LD array are equal to intervals between the cores of a multicore fiber in a design, the alignment of the output ports on both ends of the LD array enables the alignment of all the output ports.

If the optical element 103 is a PD, light from an LD or the like is incident on the other end of the optical fiber 101, the light is emitted from the light inlet/outlet ends 105, and the positional relationship between the optical fiber 101 and the base 102 is adjusted to a position where the intensity of light received by the optical element 103 is maximized, thereby achieving alignment. For example, light is received by the optical element 103, which is a PD, and alignment is performed such that a signal outputted from the electric element 104, which is a TIA, has a maximum value.

After the alignment, the adhesive 111a is cured. For example, since ultraviolet rays pass through the clad 107 made of $SiO_2$ glass, the adhesive 111a can be cured by ultraviolet rays emitted to a point of the adhesive 111a from the outside of the optical fiber 101. The ultraviolet-curing adhesive 111a is cured only by the irradiation of ultraviolet rays and hardly shrinks. Thus, by using the ultraviolet-curing adhesive, the reinforcing member no inserted into the first hole 108 can be advantageously fixed into the first hole 108 after the alignment while keeping the alignment. If heat is applied to cure the adhesive 111a, the position of alignment may be displaced by the shrinkage or expansion of parts due to a temperature change. Such a problem does not occur in photocuring in which heat is not applied.

In the foregoing example, the hole diameter of the first hole 108 is larger than the outside diameter of the reinforcing member no by about 20 µm. The accuracy of the mounting position of the reinforcing member no relative to the base 102 can be set in a range of ±several µm. Moreover, the accuracy of the installation position of the optical element 103 can be also set in a range of ±several µm. Hence, the optimum position of alignment of the input/output ports of the optical element 103 is located in a 20-µm margin that is the range of movement of the reinforcing member 110 in the first hole 108.

The first hole 108 is cylindrical and the reinforcing member no is also cylindrical, so that active alignment can be performed by moving the reinforcing member no, which is circular in cross section, in the circular first hole 108 in the cross-sectional direction. This can advantageously maximize the operating part of the reinforcing member no in the alignment while ensuring the cross-sectional area of the reinforcing member 110 in order to keep stiffness. For example, if the reinforcing member 110 is not circular but rectangular in cross section, the reinforcing member 110 being moved in the first hole 108 in the cross-sectional direction may interfere with smooth alignment because the four corners of the reinforcing member no may come into contact with the inner wall of the first hole 108. The circular shapes in cross section do not cause such a problem, leading to smooth alignment.

As described above, according to embodiments of the present invention, the optical element that is optically coupled to the light inlet/outlet ends of the optical fiber is disposed on the base placed near the light inlet/outlet ends of the optical fiber, thereby downsizing a transceiver. Moreover, embodiments of the present invention include the rod-like reinforcing member having an integral structure fixed into the first hole formed in the optical fiber and the second hole formed in the base, thereby downsizing a transceiver with high mechanical strength.

[Reference 1] K. Nakajima et al., "Holey fibers for low bend loss", Nanophotonics, vol. 2(5-6), pp. 341-353, 2013.

The present invention is not limited to the foregoing embodiment. It is obvious that various modifications and combinations can be made by a person with an ordinary skill in the art within the technical idea of the present invention.

REFERENCE SIGNS LIST

101 Optical fiber
102 Base
103 Optical element
104 Electric element
105 Light inlet/outlet end
106 Core
107 Clad
108 First hole
109 Second hole
110 Reinforcing member
111 Adhesive layer
112 Insulating member
113, 114 External terminal.

The invention claimed is:

1. An optical device comprising:
an optical fiber;
a base disposed adjacent light inlet/outlet ends of the optical fiber;
an optical element on the base and optically coupled to the light inlet/outlet ends of the optical fiber;
an electric element on the base and electrically connected to the optical element;
a first hole in a clad of the optical fiber at a vicinity of the light inlet/outlet ends of the optical fiber;
a second hole in the base at the vicinity of the light inlet/outlet ends of the optical fiber;
a rod-like reinforcing member having an integral structure fixed into the first hole and the second hole; and
an adhesive layer disposed between the rod-like reinforcing member and the first hole so as to fix the rod-like reinforcing member into the first hole.

2. The optical device according to claim 1, wherein the first hole has a hole diameter larger than a diameter of the rod-like reinforcing member.

3. The optical device according to claim 2, wherein the adhesive layer includes an ultraviolet-curing adhesive in a cured state.

4. The optical device according to claim 1, further comprising an insulating member disposed between the optical element and the base.

5. The optical device according to claim 1, further comprising an insulating member between the electric element and the base.

6. The optical device according to claim 1, wherein:
the optical fiber is a multicore fiber, and
the optical element includes a plurality of channels on the base, the channels being provided at respective light inlet/outlet ends of the multicore fiber.

7. A method comprising:
attaching an optical element to a base;

attaching an electric element to the base;
fixing a rod-like reinforcing member into a first hole in the base; and
fixing the rod-like reinforcing member into a second hole in a clad of an optical fiber such that an light input/output end of the optical fiber faces the base, wherein the optical element is optically coupled to the light input/output end of the optical fiber, and wherein the electric element is electrically connected to the light input/output end of the optical fiber.

8. The method according to claim 7, wherein fixing the rod-like reinforcing member into the second hole comprises disposing an adhesive layer disposed between the rod-like reinforcing member and the second hole so as to fix the rod-like reinforcing member into the second hole.

9. The method according to claim 8, wherein
the adhesive layer includes an ultraviolet-curing adhesive in a cured state.

10. The method according to claim 7, wherein
the second hole has a hole diameter larger than a diameter of the rod-like reinforcing member.

11. The method according to claim 7, further comprising disposing an insulating member between the optical element and the base.

12. The method according to claim 7, further comprising disposing an insulating member between the electric element and the base.

13. The method according to claim 7, wherein:
the optical fiber is a multicore fiber, and
the optical element includes a plurality of channels on the base, the channels being provided at respective light inlet/outlet ends of the multicore fiber.

* * * * *